United States Patent [19]
Cathiard

[11] Patent Number: 5,517,923
[45] Date of Patent: May 21, 1996

[54] CABLE DRAWN VEHICLE HAVING AN ON-BOARD MOTOR

[75] Inventor: Jean-Pierre Cathiard, Noyarey, France

[73] Assignee: Pomagalski S.A., France

[21] Appl. No.: 412,691

[22] Filed: Mar. 29, 1995

[30] Foreign Application Priority Data

Apr. 22, 1994 [FR] France .................................. 94 05121

[51] Int. Cl.⁶ ...................................................... B61B 11/00
[52] U.S. Cl. ......................................... 104/173.1; 104/289
[58] Field of Search .................. 104/173.1, 178, 104/187, 190, 289; 105/50; 318/376

[56] References Cited

U.S. PATENT DOCUMENTS

| | | | |
|---|---|---|---|
| 3,871,303 | 5/1975 | Woodling | 104/173.1 |
| 4,092,929 | 6/1978 | Laurent | 104/173.1 |
| 4,187,784 | 2/1980 | Fernandez et al. | 104/173.1 |
| 4,744,306 | 5/1988 | Kunczynski | 104/173.1 |
| 4,848,241 | 7/1989 | Kunczynski | 104/173.1 |
| 4,966,080 | 10/1990 | Teissier et al. | 104/289 |

FOREIGN PATENT DOCUMENTS

| | | |
|---|---|---|
| 510081 | 10/1930 | Germany . |
| 16463 | 1/1989 | Japan . |
| 329160 | 4/1958 | Switzerland . |
| 1460106 | 12/1976 | United Kingdom . |

*Primary Examiner*—Robert J. Oberleitner
*Assistant Examiner*—S. Joseph Morano
*Attorney, Agent, or Firm*—Parkhurst, Wendel & Burr

[57] ABSTRACT

A passenger transport installation making use of a continuously moving high speed traction cable for hauling vehicles, equipped with a detachable grip, along a high speed track zone. Each vehicle comprises an on-board electric motor for driving the vehicle, uncoupled from the traction cable, along the acceleration zone and the deceleration zone and an on-board rechargeable electric battery for supplying the electric power to the motor. The capacity of the battery corresponds to the power needed for the acceleration of the vehicle and during the stopping of the vehicle in the station, the battery is connected to an electric power source for recharging the battery.

4 Claims, 2 Drawing Sheets

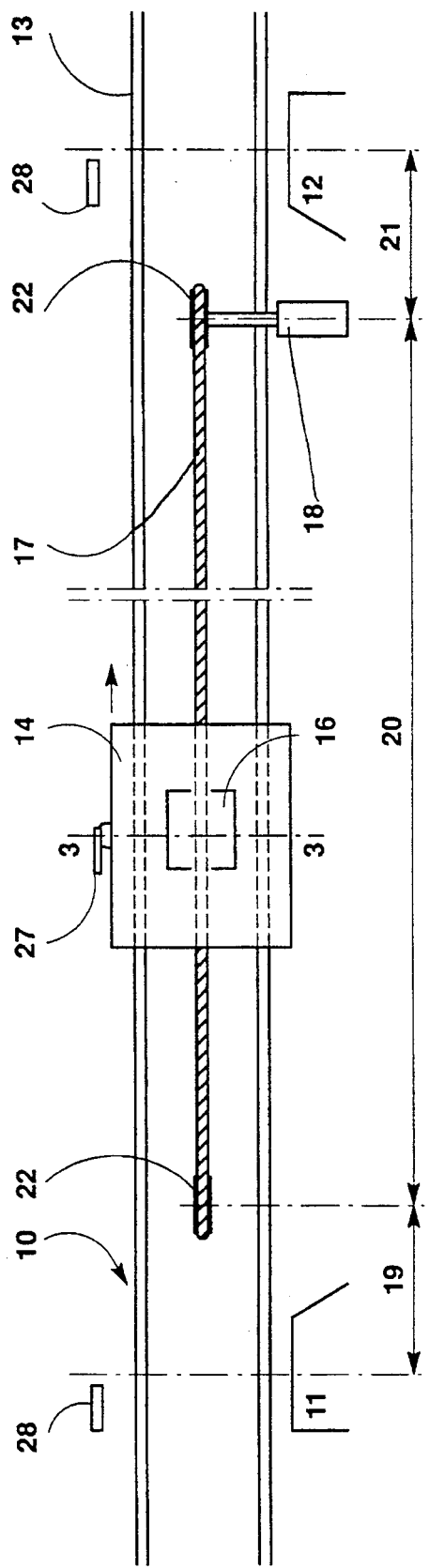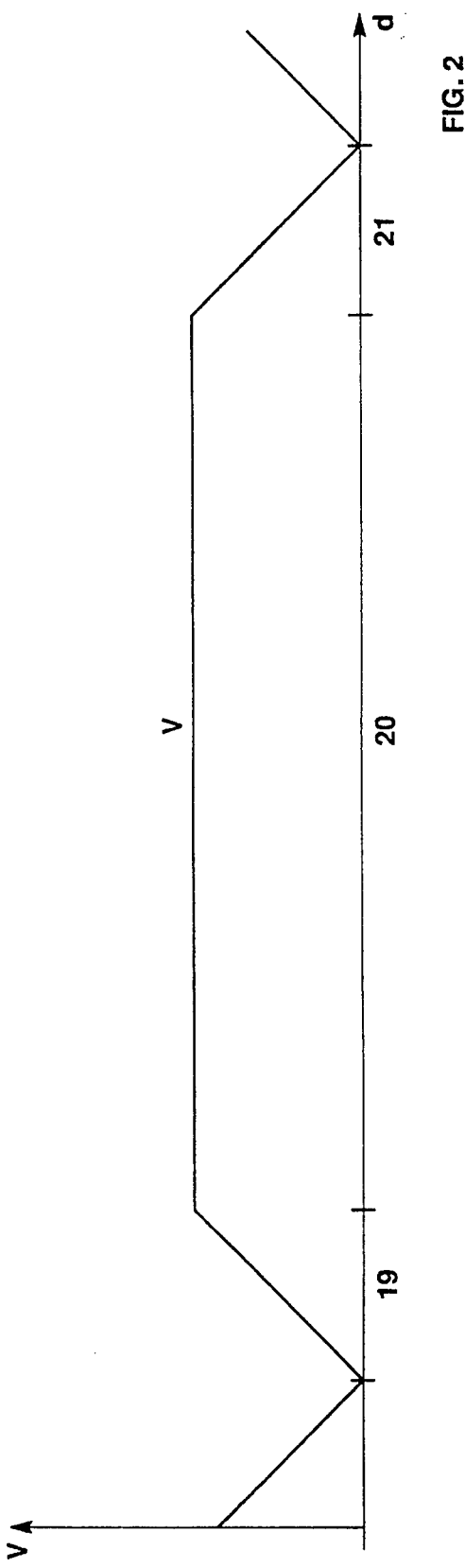

CABLE DRAWN VEHICLE HAVING AN ON-BOARD MOTOR

BACKGROUND OF THE INVENTION

1. Field of the Invention

The invention relates to a passenger transport installation having vehicles which run on rails or runways at a high speed and which stop or run at low speed in the stations for loading and unloading of the passengers. The track is equipped with a continuously moving high speed traction cable, and each vehicle comprises a detachable grip for coupling the vehicle to the traction cable on the line and for uncoupling the vehicle at the entrance of a station, where the vehicle stops. After loading and/or unloading of the passengers the vehicle is accelerated and coupled to the traction cable at the exit of the station.

2. Description of the Prior Art

Installations of the kind indicated with vehicles hauled by a continuously moving high speed cable on a special track and stopping or running at low speed in the stations for loading and unloading of the passengers are known. Each vehicle has a clamping mechanism such as a detachable coupling grip for gripping the high speed cable and at the level of the stations the vehicle is uncoupled from the high speed cable and driven by friction wheels or separate traction cables in the deceleration and acceleration zones. The known installations are complicated and necessitate devices for the synchronization of the movements of the vehicle and of the drive means in the coupling and uncoupling zones.

Another known installation comprises a traction cable which extends along the whole track section between two stations and the vehicle remains coupled to this traction cable during the whole travel on this track section. At the station the traction cable and the vehicle are stopped for loading and unloading of the passengers and the vehicle is uncoupled from the traction cable of this track section for coupling to the traction cable of the successive track section, to be driven by this traction cable along this successive track section. Such an installation has a small transport capacity.

SUMMARY OF THE INVENTION

The object of the present invention is to provide a simple installation having a high passenger transport capacity. According to the present invention each vehicle comprises an on-board electrical motor adapted for acceleration of the vehicle at the exit of the station, before the coupling to the high speed cable. The electrical power needed for this acceleration is given by an on-board battery, which is recharged in the station when the vehicle is stopped. The battery capacity is small and adapted to the power required for the acceleration of the vehicle. The weight of this small battery and of the electric motor is limited, and does not increase notably the weight of the vehicle. The battery can be used for other on-board power needs, for instance the vehicle control or illumination. The stations are not equipped with a vehicle propulsion system and are very simple. The stations are provided with an electric power source, for instance the electric power net, which may be connected to the on-board battery by sliding contacts or by an electrical connector. The electric motor is advantageously adapted to act as a generator, particularly for braking the vehicle at the entrance of the station and for generating thereby an electrical power to recharge the battery.

DESCRIPTION OF PREFERRED EMBODIMENT

The invention will be further described, by way of example, with reference to the accompanying drawings, in which:

FIG. 1 is a schematic plan view of an installation in accordance with the invention;

FIG. 2 shows the speed V variations of the vehicle running on the track of FIG. 1;

Figure 3:
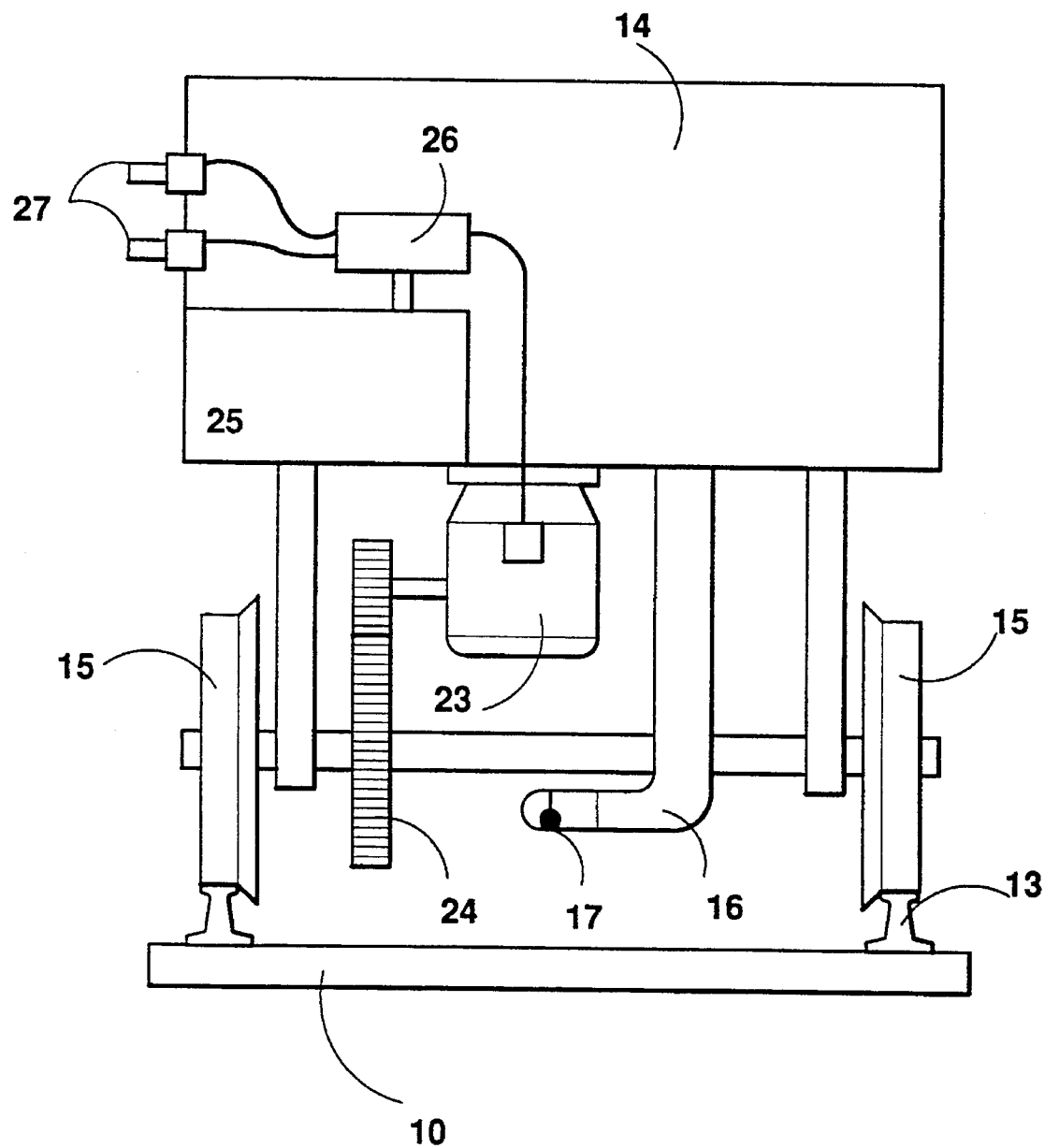
FIG. 3 is a sectional view taken on line 3—3 of FIG. 1.

FIG. 1 shows a railway track 10, which extends between two stations 11,12, and comprises two rails 13. The track may be a cableway track or a runway track with two lateral guide rails. As shown in FIG. 3 each vehicle 14 is provided with supporting wheels 15, adapted to run on the rails 13, and with a detachable grip 16, mounted on the underside of the vehicle for coupling the vehicle to a traction cable 17, extending substantially at the level of the rails 13, and continuously driven by a motor 18 at a high speed V. The track section between two stations comprises an acceleration zone 19, a high speed travel zone 20 and a deceleration zone 21. The vehicles 14 are stopped or run at low speed in the stations for loading and unloading of the passengers. At the exit of the station the vehicles 14 are accelerated to the traction cable high speed V, for coupling to this cable 17 and at the entrance of the following station they are uncoupled and braked in the deceleration zone 21.

The traction cable 17 passes over return bull wheels 22 to form an endless cable loop extending along the high speed travel zone 20 and a drive motor rotates one of these return wheels 22 to propel continuously the cable loop at high speed. The grip 16 is controlled for gripping the traction cable 17 when the vehicle 14 enters the high speed zone 20 and for ungripping the traction cable 17 at the exit of this high speed zone 20.

According to the present invention each vehicle 14 comprises an on-board electric motor 23 drivably connected by a speed reductor 24 to the wheels 15. The vehicle 14 also comprises an on-board battery 25, connected to the electric motor 23 and to sliding contacts 27 secured to the side wall of the vehicle 14. A control unit 26 regulates the electic power supply to the motor 23 and to the battery 25. The sliding contacts 27 cooperate in the station with wayside electric conductors 28, which constitute an electric power source, so that the battery 25 is recharged, while the vehicle is stopped or runs at low speed in the station.

The installation according to the invention functions in the following manner:

In the station the battery 25 of the stopped vehicle 14 is recharged. After loading and unloading of the passengers the control unit 26 is actuated so as to supply electric power to the motor 23 by the battery 25, to achieve the start and the acceleration of the vehicle 14 along the acceleration zone 19. At the entrance of the high speed zone 20 the grip 16 is closed and the vehicle 14 is hauled by the traction cable 17. The electric motor 23 is stopped. At the entrance of the deceleration zone 21 the grip 16 is opened and the vehicle 14 is braked, for instance by electrical or mechanical well known devices, so as to stop in the following station. The installation is preferably automated, and the control unit 26 controls the grip 16 actuating mechanism, the electric power supply to the motor 23 and to the battery 25 and the speed of the vehicle 14 on the acceleration and deceleration zones 19,21. It is clear that the electric motor 23 drives the vehicle 14 only a short time, during its travel along the acceleration zone 20 and that after each acceleration the battery 25 is recharged in the following station. The electric motor 23 is not used intensively and its power capacity can be small. The amount of electric power required for one acceleration of the vehicle is small and this amount can be stored in a small capacity battery 25. The time for charging such a small battery 25 is shorter than the time necessary for loading and unloading the passengers and the starting of the vehicle is not delayed by that charging.

According to the present invention the electric motor 23 is arranged to work as an electric generator for braking the vehicle 14 during its travel along the deceleration zone 21. This generator acts to recharge partially the battery 25 and the additional electric power, needed to accelerate the vehicle along the acceleration zone, is supplied in the station by the wayside electric conductors 28. The control unit 26 controls all operations of the motor/generator and can be employed to control other components.

What is claimed is:

1. A passenger transport installation having vehicles 14 which run on rails 13 or runways at a high speed and which stop or run at low speed in the stations for loading and unloading of the passengers, comprising a track having an acceleration zone 19, a high speed zone 20 and a deceleration zone 21, a continuously moving high speed traction cable 17 extending along the high speed zone 20, a grip 16 secured to the vehicle 14 for gripping the high speed cable 17 and hauling the vehicle 14 along the high speed zone 20, an on-board electric motor 23 for driving the vehicle 14 along the acceleration zone, an on-board rechargeable electric battery 25 for storage of electric power, an electric power source 28 located at the station and electric contact means 27 for connecting the electric battery 25 to the power source 28 when the vehicle is stopping in the station, to recharge the battery, wherein the capacity of said battery 25 is adapted to the power needed for the driving and acceleration of the vehicle 14 along the acceleration zone 19.

2. An installation according to claim 1, wherein the electric motor 23 is adapted to act as electric generator for braking the vehicle 14 running along the deceleration zone 21 and to recharge the electric battery 25.

3. An installation according to claim 1, comprising an on-board control unit 26 connected to the battery 25 and to the motor 23 to control the recharge of the battery 25 and the working of the motor 23.

4. An installation according to claim 3, wherein the on-board control unit 26 further controls the opening and the closing of the grip 16.

* * * * *